United States Patent
Burridge et al.

(10) Patent No.: US 10,891,233 B2
(45) Date of Patent: Jan. 12, 2021

(54) INTELLIGENT PREFETCH DISK-CACHING TECHNOLOGY

(71) Applicant: Intel Corporation, Santa Clara, CA (US)

(72) Inventors: Scott Burridge, Hillsboro, OR (US); William Chiu, Houston, TX (US); Jawad Khan, Portland, OR (US); Sanjeev Trika, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/021,677

(22) Filed: Jun. 28, 2018

(65) Prior Publication Data

US 2019/0042441 A1 Feb. 7, 2019

(51) Int. Cl.
*G06F 12/0866* (2016.01)
*G06F 12/0862* (2016.01)

(52) U.S. Cl.
CPC ...... *G06F 12/0866* (2013.01); *G06F 12/0862* (2013.01); *G06F 2212/1024* (2013.01); *G06F 2212/21* (2013.01); *G06F 2212/214* (2013.01); *G06F 2212/221* (2013.01); *G06F 2212/281* (2013.01); *G06F 2212/602* (2013.01); *G06F 2212/6028* (2013.01)

(58) Field of Classification Search
CPC ............. G06F 12/0866; G06F 12/0862; G06F 2212/1024; G06F 2212/21; G06F 2212/214; G06F 2212/221; G06F 2212/281; G06F 2212/602; G06F 2212/6028
See application file for complete search history.

(56) References Cited

U.S. PATENT DOCUMENTS

| | | | |
|---|---|---|---|
| 5,644,751 A * | 7/1997 | Burnett | G06F 12/123 711/113 |
| 8,171,219 B2 | 5/2012 | Trika et al. | |
| 9,798,754 B1 * | 10/2017 | Shilane | G06F 12/0862 |
| 2002/0178176 A1 * | 11/2002 | Sekiguchi | G06F 16/10 |
| 2010/0250834 A1 | 9/2010 | Trika et al. | |
| 2011/0145307 A1 * | 6/2011 | Ananthanarayanan | G06F 16/172 707/827 |
| 2012/0323872 A1 * | 12/2012 | Vasquez Lopez | G06F 16/172 707/704 |
| 2013/0297887 A1 * | 11/2013 | Woodward | G06F 12/0862 711/137 |
| 2014/0019689 A1 * | 1/2014 | Cain, III | G06F 12/0862 711/136 |
| 2014/0289492 A1 * | 9/2014 | Ranjith Reddy | G06F 3/061 711/170 |

(Continued)

OTHER PUBLICATIONS

"Rocket Model 2014 System Manager's Guide", Version 7 Release 4.0, May 2012, 674 pages.

*Primary Examiner* — William E. Baughman
(74) *Attorney, Agent, or Firm* — Jordan IP Law, LLC

(57) ABSTRACT

Systems, apparatuses and methods may provide for technology to automatically identify a plurality of non-volatile memory locations associated with a file in response to a close operation with respect to the file and automatically conduct a prefetch from one or more of the plurality of non-volatile memory locations that have been most recently accessed and do not reference cached file segments. The prefetch may be conducted in response to an open operation with respect to the file and on a per-file segment basis.

19 Claims, 4 Drawing Sheets

(56) References Cited

U.S. PATENT DOCUMENTS

| | | | |
|---|---|---|---|
| 2015/0032967 A1* | 1/2015 | Udayashankar | G06F 12/0862 |
| | | | 711/137 |
| 2016/0132331 A1* | 5/2016 | Godard | G06F 9/3806 |
| | | | 711/137 |
| 2017/0230476 A1* | 8/2017 | Dow | H04L 67/2847 |
| 2017/0318119 A1* | 11/2017 | Zbiljic | H04W 4/80 |
| 2018/0081569 A1* | 3/2018 | Kan | G06F 12/0868 |

* cited by examiner

INTELLIGENT PREFETCH DISK-CACHING TECHNOLOGY

TECHNICAL FIELD

Embodiments generally relate to memory structures. More particularly, embodiments relate to intelligent prefetch disk-caching technology.

BACKGROUND

Disk-caching may involve the storage of recently accessed files to non-volatile memory (NVM) that is faster to access than a disk containing the files. Caching data at the file level, however, may lead to suboptimal performance. For example, file level solutions may lead to "cache thrash" situations in which entire files are frequently added to and evicted from cache.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
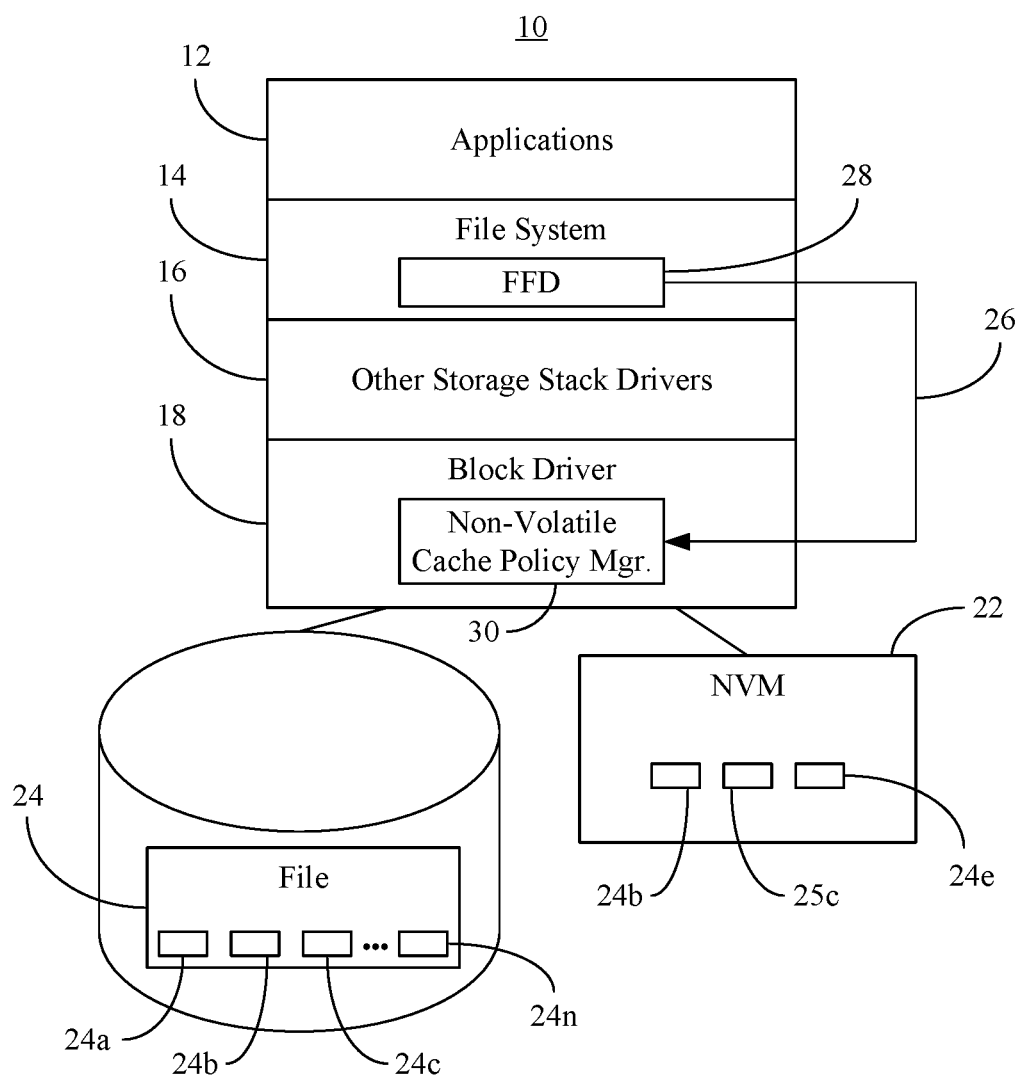
FIG. 1 is a block diagram of an example of a disk-caching architecture according to an embodiment.

Turning now to FIG. 1, a disk-caching architecture 10 is shown in which an operating system (OS) includes an applications layer 12, a file system layer 14, another storage stack driver layer 16 and a block driver layer 18. The illustrated block driver layer 18 is coupled to a drive 20 such as, for example, a hard disk drive (HDD), solid state drive (SSD), or other similar storage medium. The illustrated block driver layer 18 is also coupled to a non-volatile memory (NVM) 22 such as, for example, a cache, where the NVM 22 may generally be accessed by the block driver layer 18 more quickly than the drive 20. In the illustrated example, the drive 20 stores a file 24 (24a-24n) made up of a plurality of file segments. During operation of the applications layer 12, individual segments of the file 24 may be read and/or written to (e.g., accessed or "touched"). Upon a close of the file 24 and/or a process that operates on the file 24, file-level information 26 may be provided from a file-system filter driver (FFD) 28 at the file system layer 14 to a cache policy manager 30 (e.g., cache policy engine) at the block driver layer 18. The file-level information 26 is typically obtained at the "Ring 0" protection level (e.g., having system level privileges), whereas the applications layer 12 is typically located at the "Ring 3" protection level (e.g., lacking system level privileges).

Certain file segments such as, for example, file segments 24b, 24c and 24e, might be accessed by the applications layer 12 and cached in the NVM 22 while the file 24 is open, and then evicted from the NVM 22 after the file 24 is closed. In such a case, the next time the file 24 is opened and/or a process that operates on the file 24 is started, the cache policy manager 30 may selectively prefetch the evicted, but recently accessed, file segments 24b, 24c and 24e, from the drive 20 to the NVM 22. Prefetching the file segments 24b, 24c and 24e may significantly improve performance (e.g., reduced execution time). Moreover, the illustrated approach reduces size requirements with respect to the NVM 22 and eliminates cache thrash situations in which entire files are frequently added to and evicted from the NVM 22.

Figure 2:
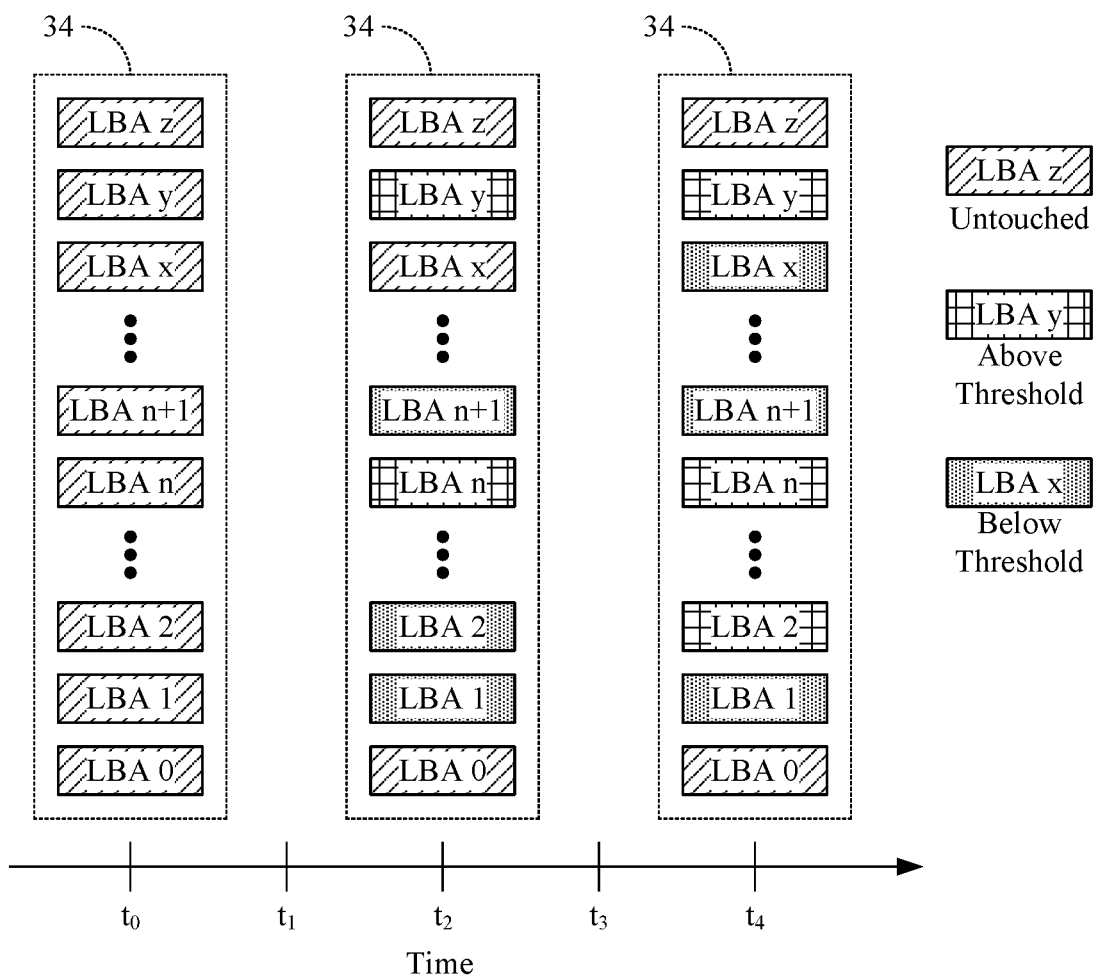
FIG. 2 is an illustration of an example of a file access sequence according to an embodiment.

FIG. 2 shows a file access sequence 32 in which a file 34 containing a plurality of segments is accessed at time $t_0$. In the illustrated example, each file segment is referenced by a particular logical block address (LBA, e.g., LBA 0 to LBA z). Although the illustrated addressing scheme is logical block addressing, other addressing schemes and/or memory granularities such as, for example, storage cache lines having a 4 kB granularity (e.g., versus a 512B LBA granularity) may be used. The accessed segments may be analyzed, tracked and/or identified while the file 34 is open, where the file 34 is closed at time $t_1$. The illustrated analysis categorizes the segments as being untouched, touched above a threshold or touched below the threshold. The threshold may be a fixed percentage of all LBAs (e.g., for all files/processes), an adaptive percentage of LBAs per file/process (e.g., based on relative age of the file/process, quantity of LBAs related to the file/process being tracked, etc.), and so forth. Of particular note is that no segments of the file 34 are prefetched the first time the file 34 is opened, in the illustrated example.

When the file 34 is subsequently opened at time $t_2$, the segments that were previously touched above the threshold (i.e., segments referenced by "LBA n" and "LBA y") may be prefetched from the drive into the cache. The prefetch may also be restricted to the segments that have been evicted from the cache. The accessed segments may again be analyzed, tracked and/or identified (i.e., as being untouched, touched above the threshold or touched below the threshold) while the file 34 is open, wherein the file 34 is closed at time $t_3$. When the file 34 is subsequently opened again at time $t_4$, the segments that were previously touched above the threshold (i.e., segments referenced by "LBA 2", "LBA n" and "LBA y") may be prefetched from the drive into the cache. Prefetching the file segments as shown significantly improves performance, reduces cache size requirements, and eliminates cache thrash situations in which entire files are frequently added to and evicted from the cache.

Figure 3:
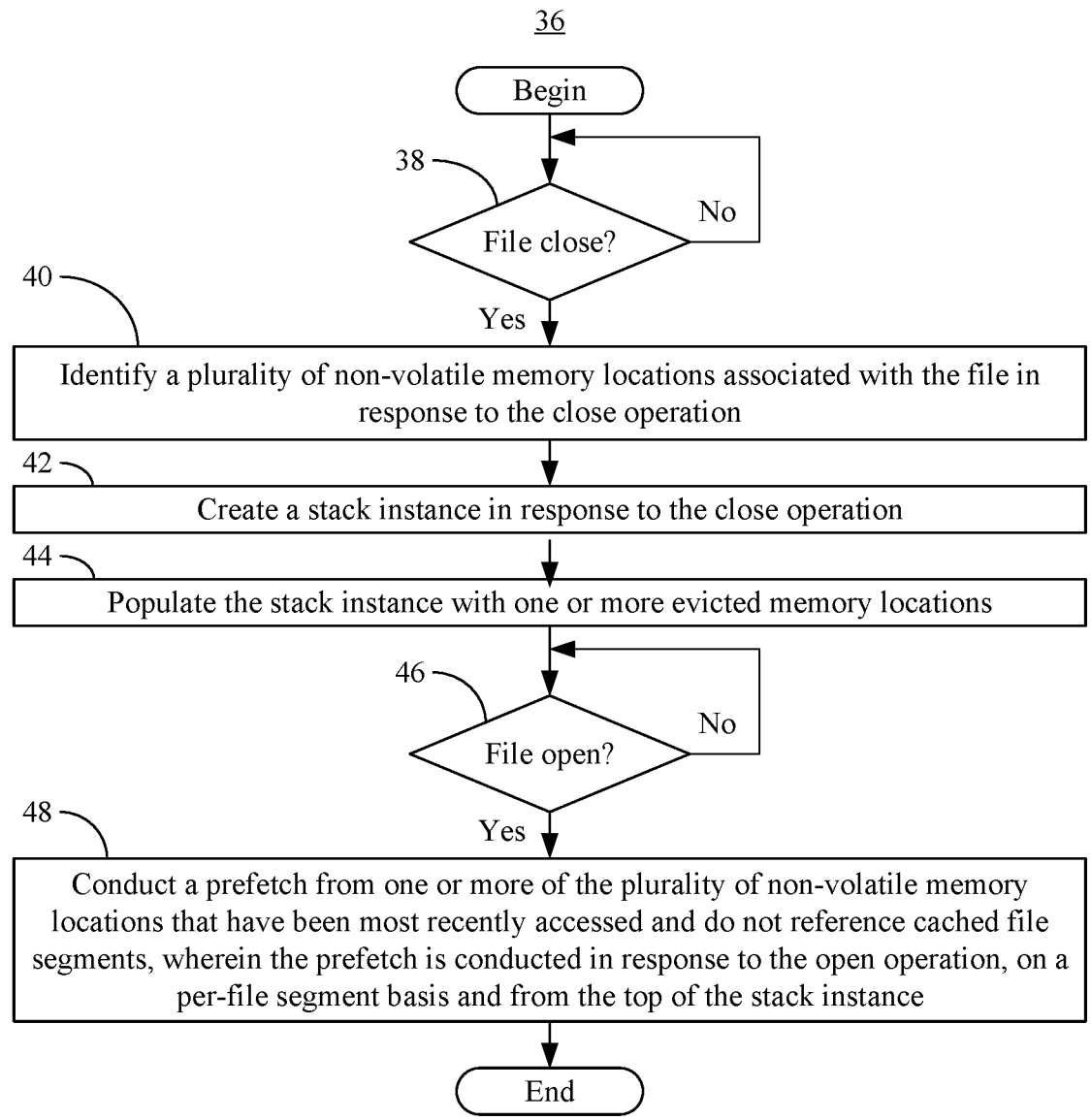
FIG. 3 is a flowchart of an example of a method of managing a cache prefetch policy according to an embodiment.

FIG. 3 shows a method 36 of managing a cache prefetch policy. The method 36 may generally be implemented by block driver and/or a cache policy manager such as, for example, the cache policy manager 30 (FIG. 1), already discussed. More particularly, the method 36 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 36 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 38 determines whether a close operation has been detected with respect to a file. Block 38 may include detecting the closing of a process that operates on the file and/or detecting the closing of the file itself. If the close operation is not detected, the illustrated method 36 enters a wait state until the close operation is detected. A timeout condition may also be incorporated into the wait state. Once the close operation is detected, block 40 identifies a plurality of non-volatile memory locations associated with the file in response to the close operation. As already noted, the memory locations may be LBAs, storage cache lines, and so forth. Block 40 may include querying a file system or FFD for the memory locations that were accessed while the file was open. Alternatively, the file system/FFD proactively sends the memory locations without involving a query. Block 40 may also include mapping the identified memory locations to a corresponding plurality of file segments in the file. For example, an LBA-to-file map (FMAP) might be created, where the FMAP is implemented as an interval tree (e.g., to support windowing queries to LBA ranges). In this regard, an FMAP may be created and maintained for a certain number (e.g., K) of recently closed files, for files closed within a certain time period (e.g., the last T1 seconds), and so forth.

A stack instance (e.g., empty stack Sf) is created in response to the close operation at block 42. In one example, the stack instance is placed on a hash table, keyed on file f, with the value being a pointer to Sf. Illustrated block 44 populates the stack instance with one or more evicted memory locations. Thus, each time a memory location (e.g., L) is evicted from the cache, block 44 may check each FMAP to determine the corresponding closed file, and if one exists, push the memory location L onto the corresponding Sf. The stack instance may be size-limited (e.g., automatically discarding the oldest entries beyond the most recent M entries), time-limited (e.g., automatically discarding entries evicted more than T2 seconds ago), and so forth.

Illustrated block 46 determines whether an open operation has been detected with respect to the file. Block 46 may include detecting the launch/start of a process that operates on the file and/or detecting the opening of the file itself. If the open operation is not detected, the illustrated method 46 enters a wait state until the open operation is detected. A timeout condition may also be incorporated into the wait state. Once the operation is detected, block 48 conducts a prefetch from one or more of the plurality of non-volatile memory locations that have been most recently accessed and do not reference cached file segments. In the illustrated example, the prefetch is conducted in response to the open operation, on a per-file segment basis and from the top of the stack instance. Thus, block 48 might simply prefetch a certain number of (e.g., the first N) memory locations from the head of the corresponding stack instance Sf. The prefetched memory locations correspond to the most recently touched memory locations for the file, that were in the cache, but are no longer in the cache. The illustrated method 36 therefore bypasses the prefetch for one or more of the plurality of non-volatile memory locations that either have not been most recently accessed (e.g., memory locations greater than N) or reference cached file segments.

The memory locations to prefetch may be sorted and coalesced into ranges (e.g., to support windowing queries and/or more efficient disk-seeking) before starting the prefetch operation of block 48. Moreover, the values K, M, N, T1 and T2 may be automatically and/or user (e.g., admin, developer) configurable on a per-file or per-directory basis.

Figure 4:
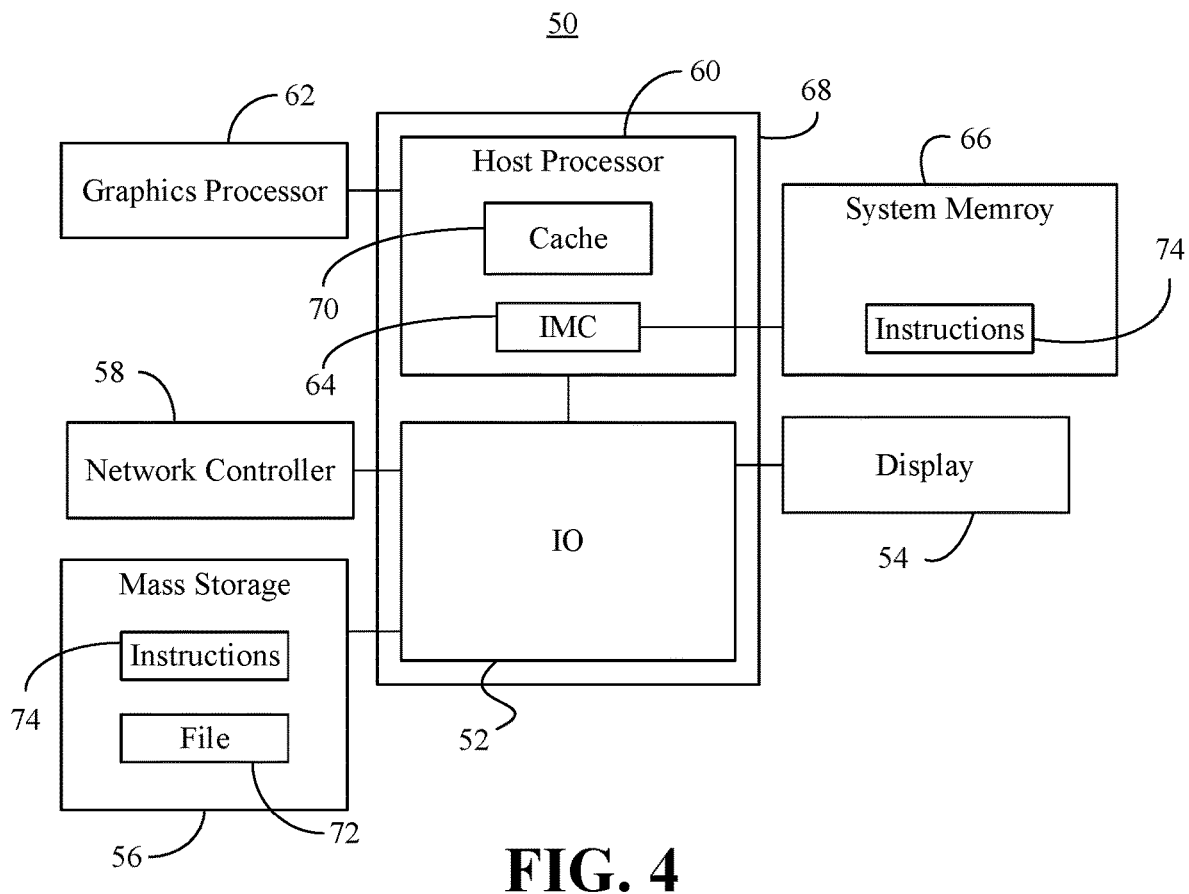
FIG. 4 is a block diagram of an example of a computing system according to an embodiment.

Turning now to FIG. 4, a performance-enhanced computing system 50 is shown. The system 50 may generally implement one or more aspects of the method 36 (FIG. 3), already discussed. More particularly, the system 50 may be part of a server, desktop computer, notebook computer, tablet computer, convertible tablet, smart television (TV), personal digital assistant (PDA), mobile Internet device (MID), smart phone, wearable device, media player, vehicle, robot, etc., or any combination thereof. In the illustrated example, an input/output (IO) module 52 is communicatively coupled to a display 54 (e.g., liquid crystal display/LCD, light emitting diode/LED display, touch screen), mass storage 56 (e.g., hard disk drive/HDD, optical disk, flash memory, solid state drive/SSD) and a network controller 58 (e.g., wired, wireless).

The system 50 may also include a graphics processor 62 and a host processor 60 (e.g., central processing unit/CPU) that includes a cache 70 and an integrated memory controller (IMC) 64, wherein the illustrated IMC 64 communicates with a system memory 66 over a bus or other suitable communication interface. The host processor 60 and the IO module 52 are integrated onto a shared semiconductor die 68 in a system on chip (SoC) architecture.

The illustrated mass storage 56 contains a file 72. Moreover, the system memory 66 and/or the mass storage 56 may include a set of instructions 74, which when executed by the host processor 60, cause the system 50 to implement one or more aspects of the method 36 (FIG. 3), already discussed. Thus, execution of the instructions 74 may cause the system 50 to automatically identify a plurality of non-volatile memory locations (e.g., logical block addresses, storage cache lines, etc.) associated with the file 72 in response to a close operation with respect to the file 72 and automatically conduct a prefetch from one or more of the memory locations that have been most recently accessed and do not reference cached file segments. As already noted, the prefetch is conducted in response to an open operation with respect to the file and on a per-file segment basis. Bypassing the prefetch for memory locations that either have not been most recently accessed or reference cached file segments may provide a number of significant advantages. For example, the illustrated solution significantly improves the performance of the system 50, reduces size requirements with regard to the cache 70, and eliminates cache thrash situations in which entire files are frequently added to and evicted from the cache 70.

Execution of the instructions 72 may also cause the computing system 50 to map the plurality of non-volatile memory locations to a corresponding plurality of file segments in the file. In one example, execution of the instructions 72 automatically creates a stack instance in response to the close operation and automatically populates the stack instance with one or more evicted memory locations, wherein the prefetch is conducted from the top of the stack instance.

The mass storage 56 contains a memory structure that may include either volatile memory or non-volatile memory. Non-volatile memory is a storage medium that does not require power to maintain the state of data stored by the medium. In one embodiment, the memory structure is a block addressable storage device, such as those based on NAND or NOR technologies. A storage device may also include future generation nonvolatile devices, such as a three dimensional (3D) crosspoint memory device, or other byte addressable write-in-place nonvolatile memory devices. In one embodiment, the storage device may be or may include memory devices that use silicon-oxide-nitride-oxide-silicon (SONOS) memory, electrically erasable programmable read-only memory (EEPROM), chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The storage device may refer to the die itself and/or to a packaged memory product. In some embodiments, 3D crosspoint memory may comprise a transistor-less stackable cross point architecture in which memory cells sit at the intersection of word lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at jedec.org). Such standards (and similar standards) may be referred to as DDR-based standards and communication interfaces of the storage devices that implement such standards may be referred to as DDR-based interfaces.

Figure 5:
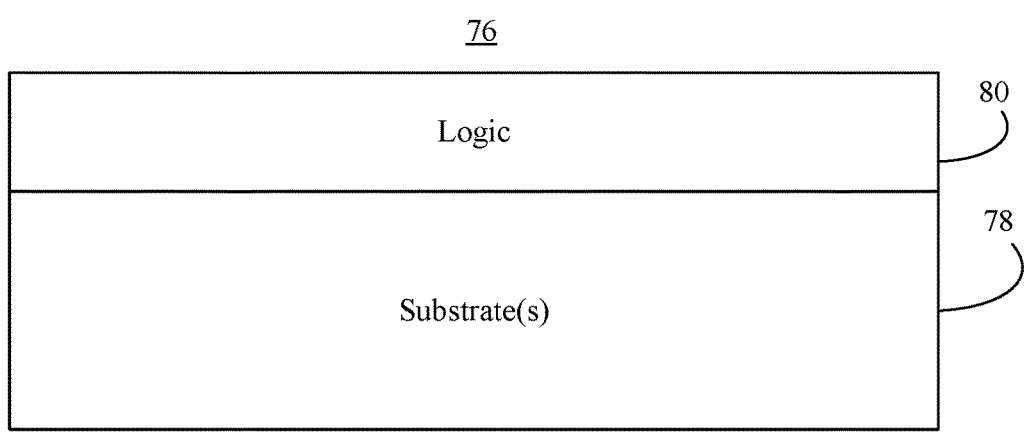
FIG. 5 is an illustration of an example of a semiconductor apparatus according to an embodiment.

FIG. 5 shows a semiconductor apparatus 76 (e.g., chip, die) that includes one or more substrates 78 (e.g., silicon, sapphire, gallium arsenide) and logic 80 (e.g., transistor array and other integrated circuit/IC components) coupled to the substrate(s) 78. The logic 80, which may be implemented at least partly in configurable logic and/or fixed-functionality hardware logic, may generally implement one or more aspects of the method 36 (FIG. 3), already discussed. Thus, the logic 80 may automatically identify a plurality of non-volatile memory locations (e.g., LBAs, storage cache lines) associated with a file in response to a close operation with respect to the file and automatically conduct a prefetch from only the memory locations that have been most recently accessed and do not reference cached file segments. The prefetch may be conducted in response to an open operation with respect to the file and on a per-file segment basis. By bypassing memory location(s) that either have not been most recently accessed or reference cached file segments, the logic 80 may improve performance, reduce size requirements with regard to the cache, and eliminate cache thrash.

In one example, the logic 80 includes transistor channel regions that are positioned (e.g., embedded) within the substrate(s) 78. Thus, the interface between the logic 80 and the substrate(s) 78 may not be an abrupt junction. The logic 80 may also be considered to include an epitaxial layer that is grown on an initial wafer of the substrate(s) 78.

Additional Notes and Examples

Example 1 may include a performance-enhanced computing system comprising a processor including a cache, a storage device to store a file, and a memory including a set of instructions, which when executed by the processor, cause the computing system to identify a plurality of non-volatile memory locations associated with the file in response to a close operation with respect to the file, and conduct a prefetch from one or more of the plurality that have been most recently accessed and do not reference cached file segments, wherein the prefetch is conducted in response to an open operation with respect to the file and on a per-file segment basis.

Example 2 may include the system of Example 1, wherein the instructions, when executed, cause the computing system to map the plurality of non-volatile memory locations to a corresponding plurality of file segments in the file.

Example 3 may include the system of Example 1, wherein the instructions, when executed, cause the computing system to create a stack instance in response to the close operation, and populate the stack instance with one or more evicted memory locations, wherein the prefetch is conducted from a top of the stack instance.

Example 4 may include the system of Example 1, wherein the plurality of non-volatile memory locations are logical block addresses.

Example 5 may include the system of Example 1, wherein the plurality of non-volatile memory locations are storage cache lines.

Example 6 may include the system of Example 1, wherein the instructions, when executed, cause the computing system to bypass the prefetch for one or more of the plurality of non-volatile memory locations that either have not been most recently accessed or reference cached file segments.

Example 7 may include a semiconductor apparatus comprising one or more substrates, and logic coupled to the one or more substrates, wherein the logic is implemented at least partly in one or more of configurable logic or fixed-functionality hardware logic, the logic coupled to the one or more substrates to identify a plurality of non-volatile memory locations associated with a file in response to a close operation with respect to the file, and conduct a prefetch from one or more of the plurality of non-volatile memory locations that have been most recently accessed and do not reference cached file segments, wherein the prefetch is conducted in response to an open operation with respect to the file and on a per-file segment basis.

Example 8 may include the semiconductor apparatus of Example 7, wherein the logic coupled to the one or more substrates is to map the plurality of non-volatile memory locations to a corresponding plurality of plurality of file segments in the file.

Example 9 may include the semiconductor apparatus of Example 7, wherein the logic coupled to the one or more substrates is to create a stack instance in response to the close operation, and populate the stack instance with one or more evicted memory locations, wherein the prefetch is conducted from a top of the stack instance.

Example 10 may include the semiconductor apparatus of Example 7, wherein the plurality of non-volatile memory locations are logical block addresses.

Example 11 may include the semiconductor apparatus of Example 7, wherein the plurality of non-volatile memory locations are storage cache lines.

Example 12 may include the semiconductor apparatus of Example 7, wherein the logic coupled to the one or more substrates is to bypass the prefetch for one or more of the plurality of non-volatile memory locations that either have not been most recently accessed or reference cached file segments.

Example 13 may include at least one computer readable storage medium comprising a set of instructions, which when executed by a computing device, cause the computing device to identify a plurality of non-volatile memory locations associated with a file in response to a close operation with respect to the file, and conduct a prefetch from one or more of the plurality of non-volatile memory locations that have been most recently accessed and do not reference cached file segments, wherein the prefetch is conducted in response to an open operation with respect to the file and on a per-file segment basis.

Example 14 may include the at least one computer readable storage medium of Example 13, wherein the instructions, when executed, cause the computing device to map the plurality of non-volatile memory locations to a corresponding plurality of file segments in the file.

Example 15 may include the at least one computer readable storage medium of Example 13, wherein the instructions, when executed, cause the computing device to create a stack instance in response to the close operation, and populate the stack instance with one or more evicted memory locations, wherein the prefetch is conducted from a top of the stack instance.

Example 16 may include the at least one computer readable storage medium of Example 13, wherein the plurality of non-volatile memory locations are logical block addresses.

Example 17 may include the at least one computer readable storage medium of Example 13, wherein the plurality of non-volatile memory locations are storage cache lines.

Example 18 may include the at least one computer readable storage medium of Example 13, wherein the instructions, when executed, cause the computing device to bypass the prefetch for one or more of the plurality of non-volatile memory locations that either have not been most recently accessed or reference cached file segments.

Example 19 may include a method comprising identifying a plurality of non-volatile memory locations associated with a file in response to a close operation with respect to the file, and conducting a prefetch from one or more of the plurality of non-volatile memory locations that have been most recently accessed and do not reference cached file segments, wherein the prefetch is conducted in response to an open operation with respect to the file and on a per-file segment basis.

Example 20 may include the method of Example 19, further including mapping the plurality of non-volatile memory locations to a corresponding plurality of file segments in the file.

Technology described herein may therefore render caches more adaptable to normal user behavior, eliminate any need to prefetch an entire file, save disk-cache capacity and improve cache hit rates. Intelligent and selective prefetches may be conduct based on the file and/or application process. For example, a disk-caching driver may be extended to maintain a history of the LBAs-in-cache associated with a given file or process. After the file is closed or the process has finished, on file re-open or process re-start, only those associated LBAs exceeding a threshold are prefetched, rather than all of the LBAs associated with the file. Accordingly, the technology may avoid polluting the cache with unneeded data. Moreover, the technology may be deployed in cache acceleration software (CAS), rapid storage technology (RST), a caching driver, a hardware cache controller, as part of a RAID (redundant array of independent disks) controller, inside or outside a disk drive, as part of another storage driver, on an operating system (OS), and so forth. Additionally, instead of querying a file system for LBAs for a file, that information may be passed in proactively by a file system or FFD. Thus, the intelligent prefetch disk-caching technology described herein makes caches more adaptable to the diverse and random usages on client machines.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   a processor including a cache;
   a storage device to store a file made up of a plurality of segments; and
   a memory including a set of instructions, which when executed by the processor, cause the computing system to:
   create a stack instance in response to a close operation,
   populate the stack instance with one or more evicted memory locations,
   identify a plurality of non-volatile memory locations associated with accesses to the file in response to the close operation with respect to the file, and
   conduct a prefetch from one or more of the plurality of non-volatile memory locations that were in the cache and have been most recently accessed but are no longer in the cache and do not reference cached file segments based on a segment-by-segment threshold determination based on an amount of the accesses for individual segments of the plurality of segments, wherein the prefetch is conducted in response to an open operation with respect to the file and on a per-file segment basis, and wherein the prefetch is conducted from a top of the stack instance.

2. The system of claim 1, wherein the instructions, when executed, cause the computing system to map the plurality of non-volatile memory locations to a corresponding plurality of file segments in the file.

3. The system of claim 1, wherein the plurality of non-volatile memory locations are logical block addresses.

4. The system of claim 1, wherein the plurality of non-volatile memory locations are storage cache lines.

5. The system of claim 1, wherein the instructions, when executed, cause the computing system to bypass the prefetch for one or more of the plurality of non-volatile memory locations that either have not been most recently accessed or reference cached file segments.

6. The system of claim 1, wherein the memory includes a transistor-less stackable cross point architecture in which memory cells sit at an intersection of word lines and bit lines, in which memory cells are individually addressable, and in which bit storage is based on a change in bulk resistance.

7. The system of claim 1, further comprising:
   determine whether the open operation has been detected with respect to the file; and
   determine whether a timeout condition has been met in response to a lack of detection of the open operation;
   wherein the prefetch operation is done in response to the determination of whether the timeout condition has been met.

8. A semiconductor apparatus comprising:
   one or more substrates; and
   logic coupled to the one or more substrates, wherein the logic is implemented at least partly in one or more of configurable logic or fixed-functionality hardware logic, the logic coupled to the one or more substrates to:
   create a stack instance in response to a close operation,
   populate the stack instance with one or more evicted memory locations,
   identify a plurality of non-volatile memory locations associated with accesses to a file made up of a plurality of segments in response to the close operation with respect to the file, and
   conduct a prefetch from one or more of the plurality of non-volatile memory locations that were in a cache and have been most recently accessed but are no longer in the cache and do not reference cached file segments based on a segment-by-segment threshold determination based on an amount of the accesses for individual segments of the plurality of segments, wherein the prefetch is conducted in response to an open operation with respect to the file and on a per-file segment basis.

9. The semiconductor apparatus of claim 8, wherein the logic coupled to the one or more substrates is to map the plurality of non-volatile memory locations to a corresponding plurality of plurality of file segments in the file.

10. The semiconductor apparatus of claim 8, wherein the plurality of non-volatile memory locations are logical block addresses.

11. The semiconductor apparatus of claim 8, wherein the plurality of non-volatile memory locations are storage cache lines.

12. The semiconductor apparatus of claim 8, wherein the logic coupled to the one or more substrates is to bypass the prefetch for one or more of the plurality of non-volatile memory locations that either have not been most recently accessed or reference cached file segments.

13. At least one non-transitory computer readable storage medium comprising a set of instructions, which when executed by a computing device, cause the computing device to:
   create a stack instance in response to a close operation,
   populate the stack instance with one or more evicted memory locations,
   identify a plurality of non-volatile memory locations associated with accesses to a file made up of a plurality of segments in response to the close operation with respect to the file; and
   conduct a prefetch from one or more of the plurality of non-volatile memory locations that were in a cache and have been most recently accessed but are no longer in the cache and do not reference cached file segments based on a segment-by-segment threshold determination based on an amount of the accesses for individual segments of the plurality of segments, wherein the prefetch is conducted in response to an open operation with respect to the file and on a per-file segment basis, and wherein the prefetch is conducted from a top of the stack instance.

14. The at least one non-transitory computer readable storage medium of claim 13, wherein the instructions, when executed, cause the computing device to map the plurality of non-volatile memory locations to a corresponding plurality of file segments in the file.

15. The at least one non-transitory computer readable storage medium of claim 13, wherein the plurality of non-volatile memory locations are logical block addresses.

16. The at least one non-transitory computer readable storage medium of claim 13, wherein the plurality of non-volatile memory locations are storage cache lines.

17. The at least one non-transitory-computer readable storage medium of claim 13, wherein the instructions, when executed, cause the computing device to bypass the prefetch for one or more of the plurality of non-volatile memory locations that either have not been most recently accessed or reference cached file segments.

18. A method comprising:
creating a stack instance in response to a close operation, populating the stack instance with one or more evicted memory locations,
identifying a plurality of non-volatile memory locations associated with accesses to a file made up of a plurality of segments in response to the close operation with respect to the file; and
conducting a prefetch from one or more of the plurality of non-volatile memory locations that were in a cache and have been most recently accessed but are no longer in the cache and do not reference cached file segments based on a segment-by-segment threshold determination based on an amount of the accesses for individual segments of the plurality of segments, wherein the prefetch is conducted in response to an open operation with respect to the file and on a per-file segment basis, and wherein the prefetch is conducted from a top of the stack instance.

19. The method of claim 18, further including mapping the plurality of non-volatile memory locations to a corresponding plurality of file segments in the file.

* * * * *